United States Patent [19]
Higuchi et al.

[11] Patent Number: 6,032,058
[45] Date of Patent: Feb. 29, 2000

[54] CELLULAR MOBILE TELEPHONE APPARATUS AND AN ALARM DEVICE THEREFOR

[75] Inventors: Kazutoshi Higuchi, Yokahama; Hiroyuki Tomihara, Hitachinaka; Yasuaki Takahara; Yoshihiro Kanomata, both of Yokohama, all of Japan

[73] Assignee: Hitachi, Ltd., Tokyo, Japan

[21] Appl. No.: 08/872,138

[22] Filed: Jun. 10, 1997

[30] Foreign Application Priority Data

Jun. 10, 1996 [JP] Japan .................................. 8-147007

[51] Int. Cl.⁷ .............................. H04B 1/38; H04B 7/00; H04B 1/08; G08B 5/22
[52] U.S. Cl. .......................... 455/567; 455/550; 455/38.2; 455/38.4; 455/575; 455/349; 455/344; 340/825.44; 340/825.46
[58] Field of Search ..................................... 455/567, 550, 455/575, 517, 38.2, 38.3, 38.4, 426, 403, 31.2, 31.3, 351, 349, 344; 340/555, 427, 311.1, 571, 687, 815.42, 825.44, 825.46

[56] References Cited

U.S. PATENT DOCUMENTS

| | | | |
|---|---|---|---|
| 4,221,932 | 9/1980 | Anglikowski et al. | 455/572 |
| 4,661,972 | 4/1987 | Kai | 455/31.2 |
| 5,040,204 | 8/1991 | Sasaki et al. | 455/552 |
| 5,289,178 | 2/1994 | Schwendeman | 340/825.44 |
| 5,327,578 | 7/1994 | Breeden et al. | 455/434 |
| 5,404,391 | 4/1995 | Wavroch et al. | 455/567 |
| 5,524,277 | 6/1996 | Yoshioka et al. | 455/550 |
| 5,722,071 | 2/1998 | Berg et al. | 455/567 |
| 5,867,796 | 2/1999 | Inutsuka | 455/567 |

FOREIGN PATENT DOCUMENTS 6-21875  1/1994  Japan .

*Primary Examiner*—Dwayne D. Bost
*Assistant Examiner*—Tracy M. Legree
*Attorney, Agent, or Firm*—Antonelli, Terry, Stout & Kraus, LLP

[57] ABSTRACT

A cellular mobile telephone apparatus including a main body, and an alarm device which is provided separately from the main body, the main body including: receiving/transmitting unit for receiving and transmitting radio frequency signals between a base station; modulating/demodulating unit for modulating and demodulating between the radio frequency signals, and a conversation signal and a control signal; telephone receiver unit for reproducing audible conversation voice in response to the demodulated conversation signal from the modulating/demodulating unit; telephone transmitting unit for converting conversation voice into the conversation signal; a controller for controlling operation of the main body of the cellular mobile telephone apparatus in accordance with the control signal; and an alarm device for providing an alarm signal which includes an identification information and is transmitted through the radio frequency, when a call is terminated at the main body; and the alarm device including: receiving unit for receiving the alarm signal of radio frequency; a discriminator for discriminating the alarm signal assigned to itself from others by the identification information included therein; and an alarm unit for alarming call termination in response to the identification by the discriminator.

14 Claims, 7 Drawing Sheets

CELLULAR MOBILE TELEPHONE APPARATUS AND AN ALARM DEVICE THEREFOR

BACKGROUND OF THE INVENTION

1. Field of the Invention

The present invention relates to a mobile radio communication apparatus including a portable telephone apparatus or a code-less telephone apparatus, more particularly to a cellular mobile telephone apparatus and an alarm device therefor, by which so called a call termination is alerted separately from a main body thereof.

2. Description of Related Art

Recently, there is available a cellular mobile telephone apparatus which alarms the call termination to a user thereof, not by a sound but through vibration thereof, so as not to disturb people around him/her by issuing the alarming sound. With such cellular mobile telephone apparatus, it must be closely touched with a body of the user so that he/she can sense the vibration. However, according to the present technical level, it is difficult to miniaturize and lighten the telephone apparatus so that it can be used comfortably even in condition that it is closely touched with the body.

For that reason, a small-sized device for alarming the call termination has been conceived, which is separately provided from the main body of the cellular mobile telephone apparatus. With this small-sized device, even if the main body of the cellular mobile telephone apparatus is put into a bag or the like, the user of the cellular mobile telephone apparatus can notice the call to his/her own telephone apparatus without disturbing the people around by the alarm sound, since it notifies the call termination thereto through it's vibration, as far as it is used closely touched with the body of the user.

Such alarming device, operates if it detects a transmitted signal, which signal is transmitted from the main body of the mobile telephone apparatus when it receives a call signal from the base station and sends back a termination signal for it, in a field of a mobile telephone system or a so-called personal phone system. Also, in Japanese Patent Laying-Open No. 6-21875 (1994), there is disclosed a cellular mobile telephone apparatus having an auxiliary device or unit for alarming the call termination through vibration, which is provided separately from the main body and connected through a cable or a radio frequency signal therebetween.

However, in the prior art mentioned above, since there is not necessarily established a relationship between the cellular mobile telephone apparatus and the alarm device or auxiliary unit in a one-to-one correspondence, there is a drawback that the alarm device confuses and erroneously starts vibration responding to the transmitted signal of noticing the call termination from the mobile telephone apparatus of others, in particular when it is located or used in the vicinity thereof.

Further, information which can be obtained from the alarm device by the vibration is limited to call termination of his/her own cellular mobile telephone apparatus. Therefore, there are other drawbacks that the main body of the cellular mobile telephone apparatus generates an alarm sound when the battery thereof comes near to be exhausted for notifying it to the user, thereby disturbing the other people around, and that when the user who is carrying the alarm device with him/her is away from his/her own cellular mobile telephone apparatus, he/she fails to hear the arisen alarm sound, nor to notice that it is in the condition that it cannot respond to a call any more because of the exhaustion of the battery.

SUMMARY OF THE INVENTION

According to the present invention, by noting such drawbacks mentioned above, it is an object to provide a cellular mobile telephone apparatus and an alarm device therefor, with which the user thereof can always notice the call termination at his/her own cellular mobile telephone apparatus.

Another object of the present invention is to provide a cellular mobile telephone apparatus and an alarm device therefor, with which the user thereof can also notice the other conditions of his/her own cellular mobile telephone apparatus.

For achieving the above object, according to the present invention, there is provided a cellular mobile telephone apparatus comprising a main body, and an alarm device which is provided separately from said main body, said main body including:

receiving/transmitting means for receiving and transmitting radio frequency signals between a base station;

modulating/demodulating means for modulating and demodulating between the radio frequency signals and conversation signal;

telephone receiver means for reproducing audible conversation voice in response to the demodulated conversation signal from said modulating/demodulating means;

telephone transmitting means for converting conversation voice into the conversation signal;

means for controlling operation of said main body of said cellular mobile telephone apparatus; and means for providing an alarm signal which includes an identification information and is transmitted through the radio frequency, when a call is terminated at said main body; and said alarm device including:

receiving means for receiving the alarm signal of radio frequency;

means for discriminating the alarm signal assigned to itself from others by the identification information included therein; and alarm means for alarming call termination in response to result of the identification by said identifying means.

Further, for achieving the above object, according to the present invention, there is also provided a cellular mobile telephone apparatus comprising:

receiving/transmitting means for receiving and transmitting radio frequency signals between a base station;

modulating/demodulating means for modulating and demodulating between the radio frequency signals and conversation signal;

telephone receiver means for reproducing audible conversation voice in response to the demodulated conversation signal from said modulating/demodulating means;

telephone transmitting means for converting conversation voice into the conversation signal;

means for controlling operation of said cellular mobile telephone apparatus; and means for providing an alarm signal which includes an identification information and is transmitted through the radio frequency.

Moreover, for achieving the above object, according to the present invention, there is provided an alarm device for a cellular mobile telephone apparatus, being provided separately from said cellular mobile telephone apparatus, comprising:

receiving means for receiving an alarm signal of radio frequency;

means for discriminating the alarm signal assigned to itself from others by an identification information included therein; and alarm means for alarming call termination in response to result of the identification by said identifying means.

BRIEF DESCRIPTION OF THE DRAWING(S)

DESCRIPTION OF THE PREFERRED EMBODIMENTS

Hereinafter, an embodiment of the present invention will be explained by referring to the attached drawings.

Figure 1:
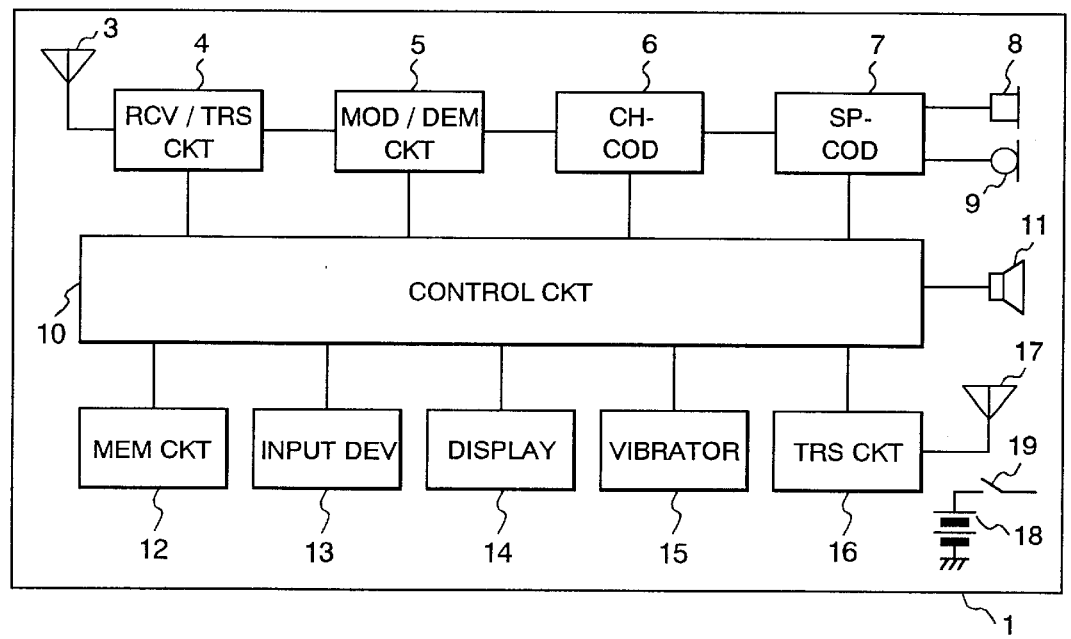
FIG. 1 shows constructions of a cellular mobile telephone apparatus and an alarm device as an embodiment according to the present invention.
Figure 1:
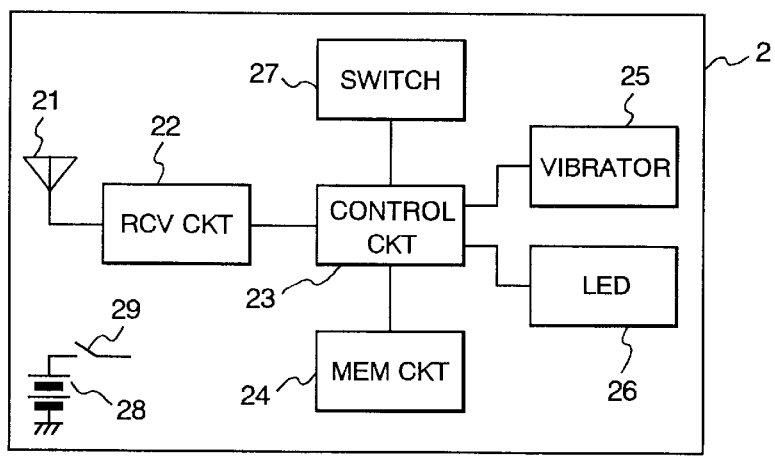
Figure 2:
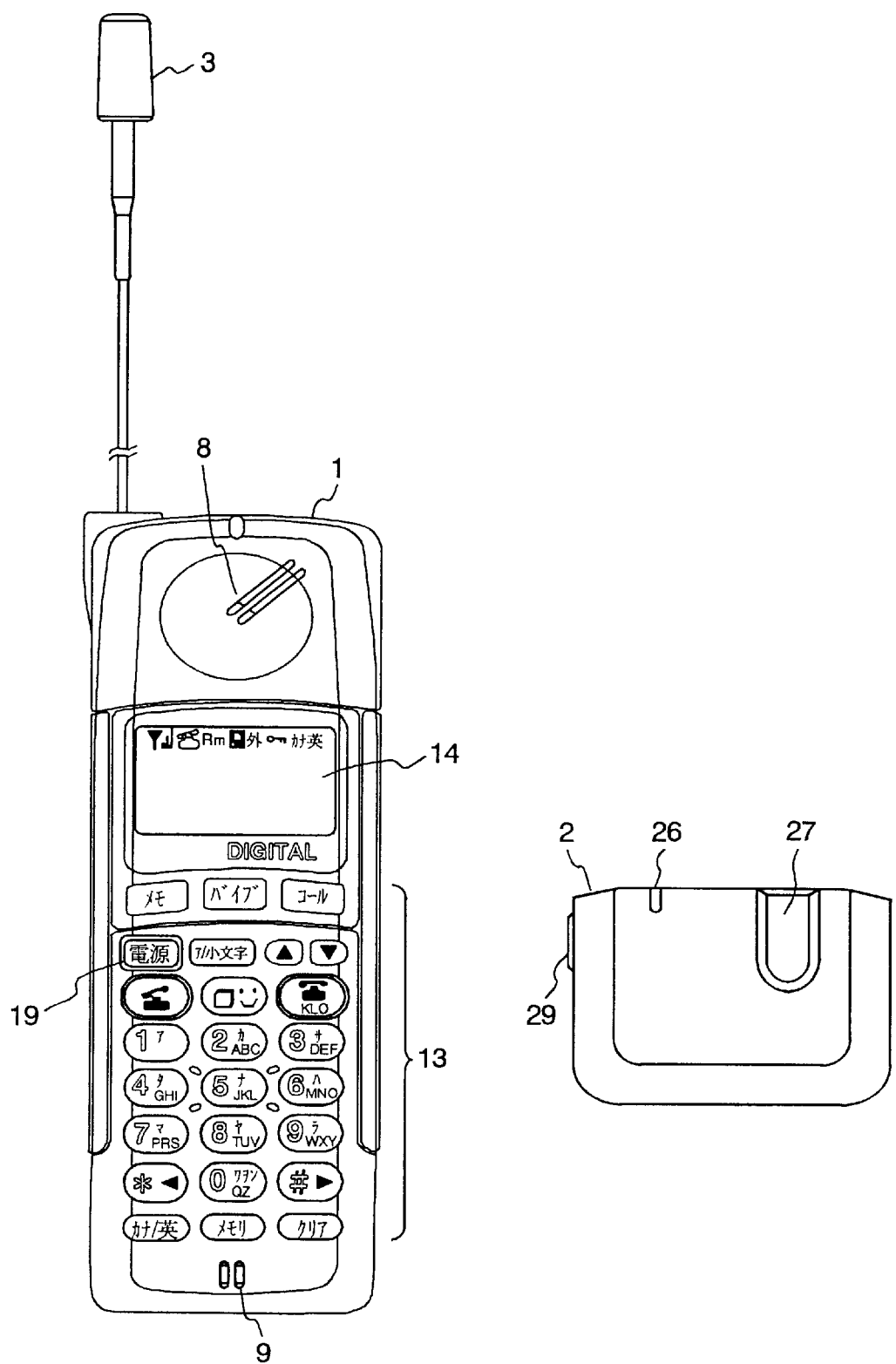
FIG. 2 shows external view of the cellular mobile telephone apparatus and the alarm device as the embodiment according to the present invention.

In FIG. 1, there is shown an example internal construction of a cellular mobile telephone apparatus and an alarm device therefor, as an embodiment in accordance with the present invention, and in FIG. 2, an external view of the cellular mobile telephone apparatus and the alarm device, as an embodiment in accordance with the present invention.

As shown in FIG. 1, a mobile telephone apparatus is constructed with a main body 1 as the cellular mobile telephone apparatus and the alarm device 2 which is being separated from the main body 1.

First, in the main body of the cellular mobile telephone apparatus 1, a radio communication signal which is transmitted from a base station (not shown in the drawings) is received via an antenna 3 and inputted into a radio signal receiving/transmitting circuit 4, and is converted into an intermediate-frequency signal therein. The received intermediate-frequency signal is demodulated by a digital modulating/demodulating circuit 5 into a digital signal, and the received signal which is demodulated into the digital signal is decoded by an error correction coding/decoding circuit 6. Here, the signal outputted by decoding by the error correction coding/decoding circuit 6 includes a digital conversation signal and a digital control signal. Between those two signals, the digital control signal which relates to a protocol is supplied to a control circuit 10 which controls channel assignment, etc. The digital conversation signal, after being treated with a decoding process by an audio coding/decoding circuit 7 and is decoded back into an analogue conversation signal, is outputted from a receiver 8.

On the contrary, after conversation voice is being exchanged into a transmission signal by a transmitter 9, it is encoded to a digital transmission signal by the audio encoding/decoding circuit 7. The digital transmission signal, as well as the digital control signal, after being encoded by the error correction encoding/decoding circuit 6, is inputted into a digital modulation/demodulation circuit 5 to be modulated into quadrature modulation signal. The modulated signal is exchanged into a high frequency signal of a predetermined radio frequency by the radio transmitting/receiving circuit 4 and is transmitted through the antenna 3 to the base station.

By the way, the above-mentioned control circuit 10 includes a micro-computer as a main control part, and it includes a termination alarm control means therein, in addition to a function of controlling all parts thereof. The termination alarm control means generates a termination alarm signal when the received digital signal is the termination signal addressed to that telephone itself. Normally, the termination alarm signal initiates the operation of a sounder 11 to generate an alerting sound. A battery 18 is used as an electrical power source of the cellular mobile telephone apparatus 1 and supplies the electrical power to every part thereof through a power switch 19.

Next, the operation of the cellular mobile telephone apparatus 1 and the construction of the alarm device 2, in accordance with the present invention, will be explained by referring to FIGS. 1 through 5 and tables 1 and 2.

Under waiting condition, the cellular mobile telephone apparatus 1 is watching whether the termination signal addressed to that apparatus itself is arrived from the base station or not. Under this condition, when arriving the termination signal received is addressed to itself, the control circuit 10 acknowledges it and generates the termination alarm signal. Upon the termination alarm signal, a vibrator 15 which is provided in the cellular mobile telephone apparatus 1 is driven, and alternatively, the sounder 11 issues an alarm of it.

At the same time, by operating an alarm transmitting circuit 16, the transmission information is transmitted by a radio frequency signal from an alarm transmitting antenna 17 which is provided in the cellular mobile telephone apparatus 1 to the alarm device 2. Namely when transmitting by the radio frequency signal, the control circuit 10 forms a format for information transmission as shown in FIG. 3, and sends it at a transfer speed of 512 bps to the alarm transmitting circuit 16, by which it is modulated into FM signal and is transmitted from the antenna 17 for transmitting the termination alarm.

The alarm device 2 has an antenna 21 for receiving the radio frequency signal transmitted from the cellular mobile telephone apparatus 1 and a function of detecting a field intensity of the received radio frequency signal for checking the existence of the received radio frequency signal, and in addition thereto, it is constructed with an alarm receiving circuit 22 for demodulating the received radio frequency signal, an alarm control circuit 23, and an alarm memory circuit 24. Here, the termination alarm control circuit 23, including a micro computer therein, drives a vibrator 25 and a two (2) color LED display device 26 upon deciding the information which is transmitted from the cellular mobile telephone apparatus 1, and monitors the condition of a push button switch 27. The alarm memory circuit 24, being connected to the alarm control circuit 23, memorizes an identification (ID) number for identifying respective alarm device 2 thereof, and an information of whether the cellular mobile telephone apparatus 1 is located within an area where the cellular mobile telephone service is available or not. As an electric power source of the alarm device 2, a battery 28 is used and it supplies the electric power to each part thereof through a power switch 29.

Figure 3:
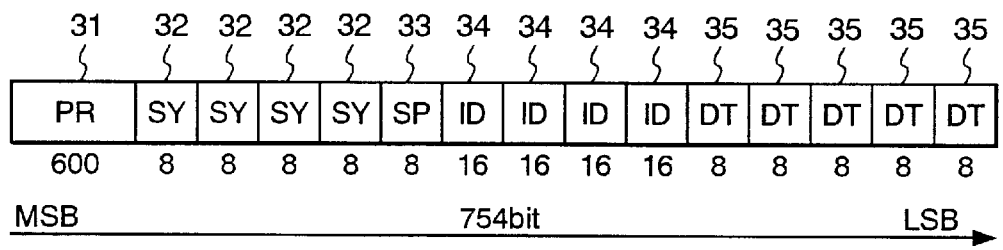
FIG. 3 shows formats of transmitted information as the embodiment according to the present invention.
Figure 3:
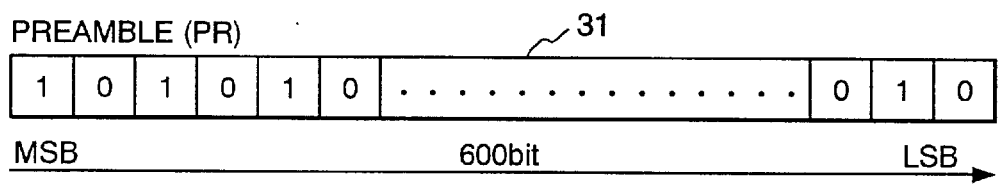
Figure 3:
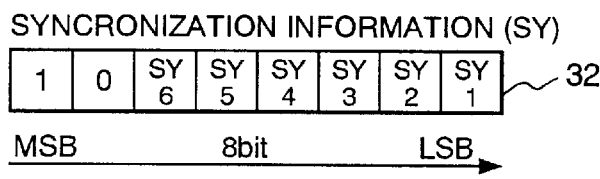
Figure 3:
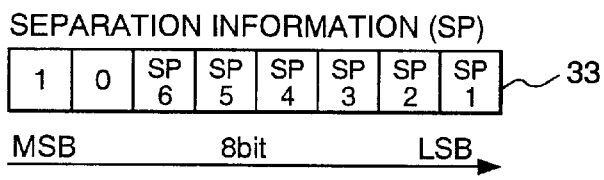
Figure 3:
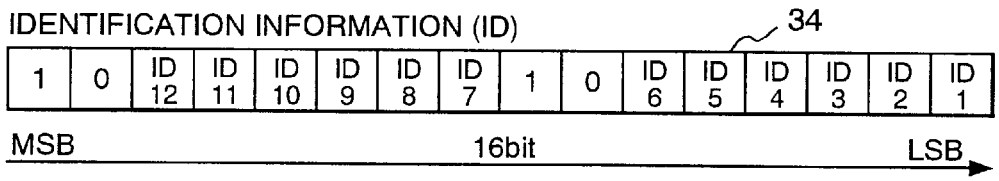
Figure 3:
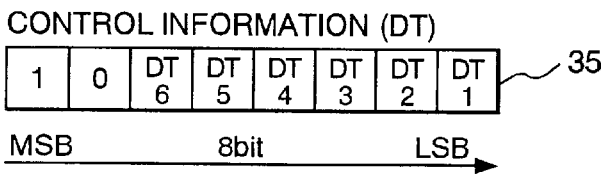

FIG. 3 shows a format of the information transmitted from the cellular mobile telephone apparatus 1 to the alarm device 2, in accordance with the present invention. The transmitted information is formed by 754 bits in total, and is separately constructed by a preamble 31, a synchronizing information 32, a separation information 33, an identification (ID) information 34, and a control information 35.

The transmission of the information from the cellular mobile telephone apparatus 1 is performed by every eight (8) bits as a transmission unit of bits, and the two (2) bits within the transmission unit as an unit of information transmission, and the two (2) bits at the top thereof are assigned to start bits of "1" and "0", respectively. Those two (2) bits are used so as to make synchronization in the modulation by every eight (8) bits. Therefore, the effective bits are six (6) bits in the transmitted information of eight (8) bits.

(1) The preamble 31 is formed by 600 bits of repetitive pattern, repeating between "1" and "0" in every two (2) bits, because it is not provided for the purpose of information transmission but only for detecting the received radio frequency signal.

However, since the alarm device 2 performs an intermittent receiving operation in order to suppress exhaustion of the battery 28 thereof, continuous transmission of the signal for a certain period of time is needed at the transmission side for the received signal to be detected at the intermittent operation timing.

(2) Each synchronization information 32 is made by information of 8 bits, and the same synchronization information continuously repeats for 4 times. This is a pre-set code in common for the alarm devices 2, for the purpose of obtaining a synchronization by the unit of 8 bits for information transmission following the preamble 31.

(3) The separation information is also made by information of 8 bits. This is also a code which is preset in common among the alarm devices 2, for the purpose of acknowledging information of the identification (ID) information 34 following the synchronization information 32.

(4) The identification information 34 is made of information of 16 bits, and the same identification information 34 is continuously repeated 4 times. This is a code, which is preset to each of the alarm devices 2, for the purpose of respectively identifying the alarm devices, and the effective information elements of it are 12 bits. In the cellular mobile telephone apparatus 1, a part of the memorizing circuit 12 is used as a means for maintaining the identification information 34. This identification information memorized in the memorizing circuit 12 can be changed in the contents thereof, for example, by inputting the respective identification number of the alarm device 2 to be used through key input device 13. The inputted identification number is exchanged into an identification information 34 of digital code through the control circuit 10 and is memorized in the memorizing circuit 12. Furthermore, the inputted identification number can be checked by displaying it on the LCD display device 14. With this construction, the user can easily change the contents of the identification information 34 when he/she wishes to use another alarm device 2, for example on a ground of loosing his/her alarm device 2.

As the identification information, moreover, there can be used a call code which the cellular mobile telephone apparatus 1 owns respectively, and a specific number or a part thereof, including a serial production number of the cellular mobile telephone apparatus 1, or that of the alarm device 2.

(5) The control information 35 is made of 8 bits, and the same control information 35 repeats 5 times. This is a code which is determined in common among the alarm devices 2 for controlling thereof and has 6 bits as effective information elements.

As shown in a TABLE 1, the alarm device 2 has three (3) independent elements of operation, including operation of the vibrator 25, controlling of the two color LED display device 26, and displaying of information of whether the cellular mobile telephone apparatus 1 is locating within the service area or not. Therefore, as the information for operating those, the control information 35 has fourteen (14) kinds of coded information, including eight (8) kinds of vibration patterns (more concrete patterns are shown in the TABLE 2) of the vibrator 25, four (4) kinds of display patterns, and two (2) kinds of information of whether the cellular mobile telephone apparatus 1 is locating within the service area or not. Those are direct functions of the alarm device 2, but it is necessary to previously inform the user what kinds of conditions of the cellular mobile telephone apparatus 1 are indicated by those functions, through a user's manual or actually operating the alarm device 2.

TABLE 1

| Operation Element | DT 6 | DT 5 | DT 4 | DT 3 | DT 2 | DT 1 | Function |
|---|---|---|---|---|---|---|---|
| Vibrator | X | X | X | 0 | 0 | 0 | stop vibrator |
|  | X | X | X | 0 | 0 | 1 | drive vibrator in vibration pattern 1 |
|  | X | X | X | 0 | 1 | 0 | drive vibrator in vibration pattern 2 |
|  | X | X | X | 0 | 1 | 1 | drive vibrator in vibration pattern 3 |
|  | X | X | X | 1 | 0 | 0 | drive vibrator in vibration pattern 4 |
|  | X | X | X | 1 | 0 | 1 | drive vibrator in vibration pattern 5 |
|  | X | X | X | 1 | 1 | 0 | spare 1 |
|  | X | X | X | 1 | 1 | 1 | spare 2 |
| Area Inf. | X | X | 0 | X | X | X | inside of service area |
|  | X | X | 1 | X | X | X | outside of service area |
| LED | 0 | 0 | X | X | X | X | distinguish LED |
|  | 0 | 1 | X | X | X | X | turns red LED on and off |
|  | 1 | 0 | X | X | X | X | turns green LED on and off |
|  | 1 | 1 | X | X | X | X | turns red and green LEDs on and off simultaneously |

TABLE 2

| Number of vibration patter | Operation of Vibrator |
|---|---|
| 1 | repeating ON(0.5 sec)/OFF(0.5 sec) for a time period of 15 sec |
| 2 | repeating ON(1. sec)/OFF(2.0 sec) for a time period of 15 sec |
| 3 | repeating ON(0.5 sec)/OFF(3.0 sec) for a time period of 15 sec |

TABLE 2-continued

| Number of vibration patter | Operation of Vibrator |
|---|---|
| 4 | ON for a time period of 3.0 sec |
| 5 | ON for a time period of 15 sec |

Namely, the cellular mobile telephone apparatus 1 assigns those three conditions, i.e., the termination at the cellular mobile telephone apparatus 1, the exhaustion of the battery 18 of the cellular mobile telephone apparatus 1, and the information of whether the cellular mobile telephone apparatus 1 is located within the service area or not, to the respective operations of the alarm device 2, previously. For example, in case of termination to the cellular mobile telephone apparatus 1, the vibrator 25 is operated with a vibration pattern 1, and a red color LED of the two color LED display device 26 turns on and off. When the battery 18 of the cellular mobile telephone apparatus 1 is exhausted, the vibrator 25 operates with a vibration pattern 2, and the red color LED and the green color LED of the two color LED display device 26 turn on and off at the same time. When the cellular mobile telephone apparatus 1 is located in the area where the cellular mobile telephone service is available, information indicating such is memorized into the alarm memorizing circuit 24 of the alarm device 2.

Figure 4:
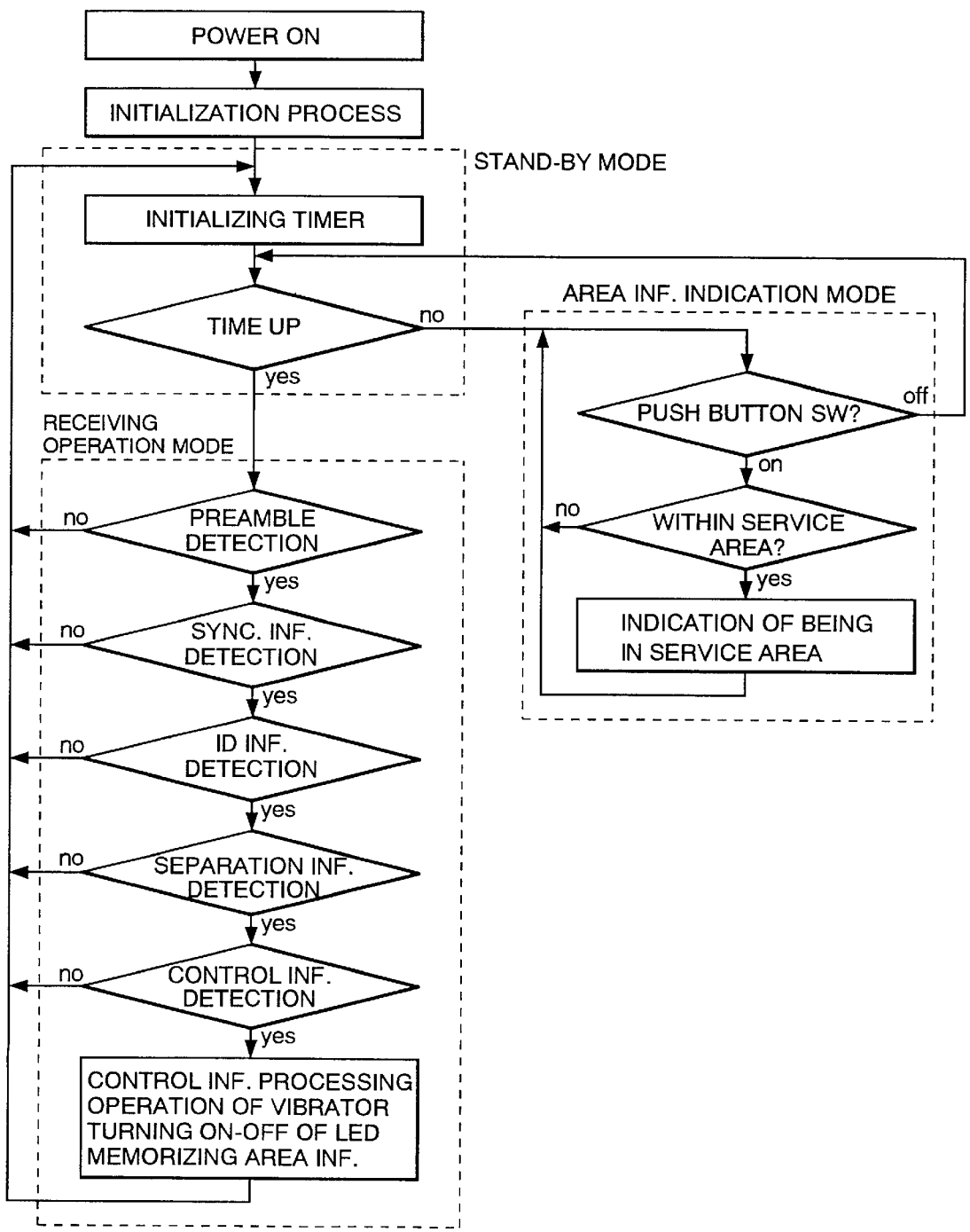
FIG. 4 shows an operation flow chart of the alarm device as the embodiment according to the present invention.

Next, the operation of the alarm device 2 of an embodiment in accordance with the present invention will be explained by referring an operation flow chart thereof shown in FIG. 4.

The alarm device 2 has three (3) modes, including a stand-by mode, a receiving operation mode, and an indication mode of whether the cellular mobile telephone apparatus 1 is located within the service area. After the power switch 29 is turned on, the alarm device 2 conducts an initializing processing, and moves into the stand-by mode.

The stand-by mode is a mode for determining the operation timing of the alarm device 2. The alarm device 2 performs the intermittent receiving operation at an interval of 750 ms for decreasing the exhaustion of the battery 28 thereof as much as possible. The alarm control circuit 23 of the alarm device 2 sets a timer function of 700 ms and stops the other functions. When the timer counts up to the preset time, the alarm device 2 shifts into the receiving operation mode.

In the receiving operation mode, the alarm device 2 operates in accordance with the contents of the transmitted information from the cellular mobile telephone apparatus 1. The alarm control circuit 23 analyzes the transmitted information, makes the vibrator 25 and the two color LED display device 26, and memorizes into the alarm memorizing circuit 24 the information of whether the cellular mobile telephone apparatus 1 is located within the service area or not.

(1) In detecting the preamble, receiving operation is conducted for 50 ms and the preamble is acknowledged when continuously detecting repetitive pattern between "1" and "0" for 12 bits. In case that it is impossible to detect the continuous repetitive pattern between "1" and "0" for 12 bits within 50 ms, it moves back into the stand-by mode. In the detecting, since the unit for information transmission is of 8 bits and the 2 bits thereof are assigned to the start bits, i.e., two (2) bits of "1" and "0", the received radio frequency signal is demodulated in synchronization with each 8 bits so as to take out the information thereof.

Here, the operation of the alarm transmitting circuit and the alarm receiving circuit of an embodiment in accordance with the present invention will be explained in more detail by referring the operating timing shown in FIG. 5.

Figure 5:
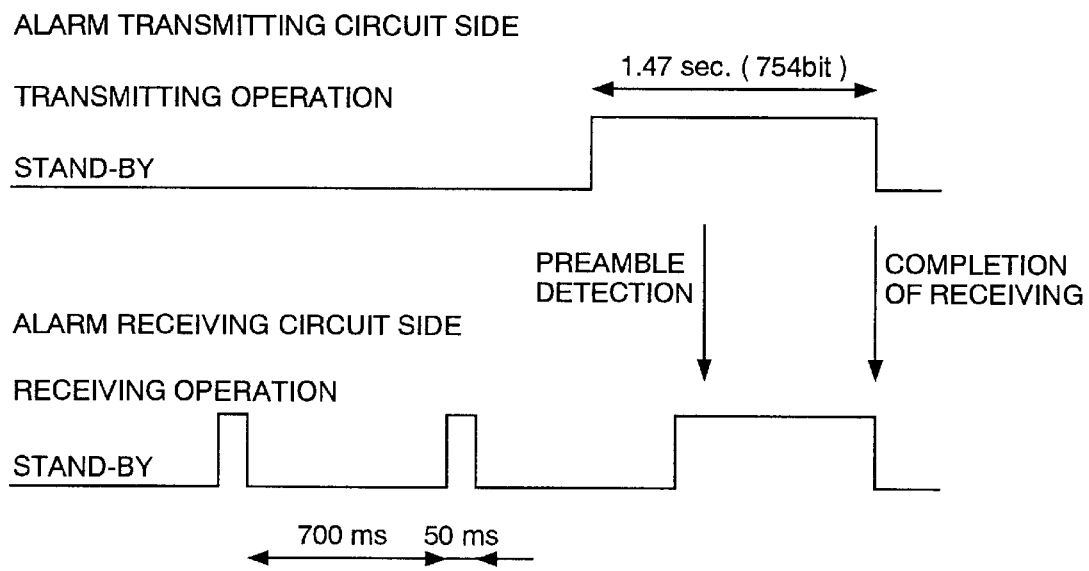
FIG. 5 shows an operation timing of an alarm transmitting circuit and an alarm receiving circuit as the embodiment according to the present invention.

In FIG. 5, the horizontal axis indicates time and the vertical axis the mode of the operation. In case of no received radio frequency signal (the alarm transmitting circuit 16 is in the stand-by mode), since it is impossible to detect the preamble 31, the alarm device 2 performs the intermittent receiving operation, repeating between the receiving operation for 50 ms and the stand-by operation for 700 ms.

In case that the alarm transmitting circuit 16 is in receiving operation and the preamble 31 is transmitted in the same time period, the preamble 31 is detected if the alarm receiving circuit 22 of the alarm device 2 is in the receiving operation, and the information can be received continuously thereafter. Therefore, the time period when the preamble 31 is detected must be set to be longer than the period (750 ms) of the intermittent receiving operation. Here, as mentioned previously, since the preamble is formed of 600 bits and the transfer speed is set at 512 bps, the time period during which the preamble 31 is transmitted is more than 1 second, therefore, there is no possibility that it goes beyond the period of the intermittent receiving operation. Further, if it is possible to detect the preamble 31, the alarm device 2 extends the time of the receiving operation continuously until it completes the receiving of the information, for receiving the information thereafter.

(2) In detection of the synchronization information, the detection of the synchronization information is acknowledged when one (1) of the four (4) synchronization information 32 continuously transmitted is detected. No synchronizing information 32 can be detected, then it moves back into the stand-by mode.

(3) In detection of the separation information, the detection of the separation information is acknowledged when any four (4) bits or more than that of the eight (8) bits within the separation information 33 coincide with a preset separation information 33. Otherwise, it moves back into the stand-by mode. 42

(4) In detection of the identification information, the detection of the identification information is acknowledged when any one of the four (4) identification information 34 which are continuously transmitted coincides with the identification information 34 memorized in the alarm memorizing circuit 24. If no identification information 34, nor coincidence with the identification information 34 memorized in the alarm memorizing circuit 24 can be detected, it moves back into the stand-by mode.

(5) In detection of the control information, the detection of the control information is acknowledged when the coincidence among any three (3) or more than that of the control information 35 can be detected within the five (5) control information 35 which are continuously transmitted. Otherwise, it moves back into the stand-by mode.

(6) In processing of the control information, in accordance with the control information 35, the vibrator 25 of the alarm device 2 is operated, the LEDs of the two color LED display device 26 are turned on and off, and the information of whether it is located within the service area or not is memorized in the alarm memorizing circuit 24, as shown in TABLE 1. Upon the completion of the processing of the control information, it moves back into the stand-by mode.

As mentioned in the above, since the cellular mobile telephone apparatus 1 assigns the three conditions thereof to the alarm device 2, respectively, i.e., alarming the termination at the cellular mobile telephone apparatus 1, alarming the exhaustion of the battery 18 of the cellular mobile telephone apparatus 1, and the information of whether the cellular mobile telephone apparatus 1 is located within the service area or not, the user can notice the call termination at his/her cellular mobile telephone apparatus 1 and the exhaustion of the battery 18 thereof, by the specific operation patterns of the alarm device 2.

Further, in the indication mode of location within the service area, when the push button switch 27 is pushed during when the alarm device 2 is in the stand-by mode, it checks the information memorized in the alarm memorizing circuit 24 and displays on the two color LED display device 26 whether the cellular mobile telephone apparatus 1 is located within the area where the cellular mobile telephone service is available or not. When the user notices this and stops pushing down the push button switch 27, it turns back into the stand-by mode.

Figure 6:
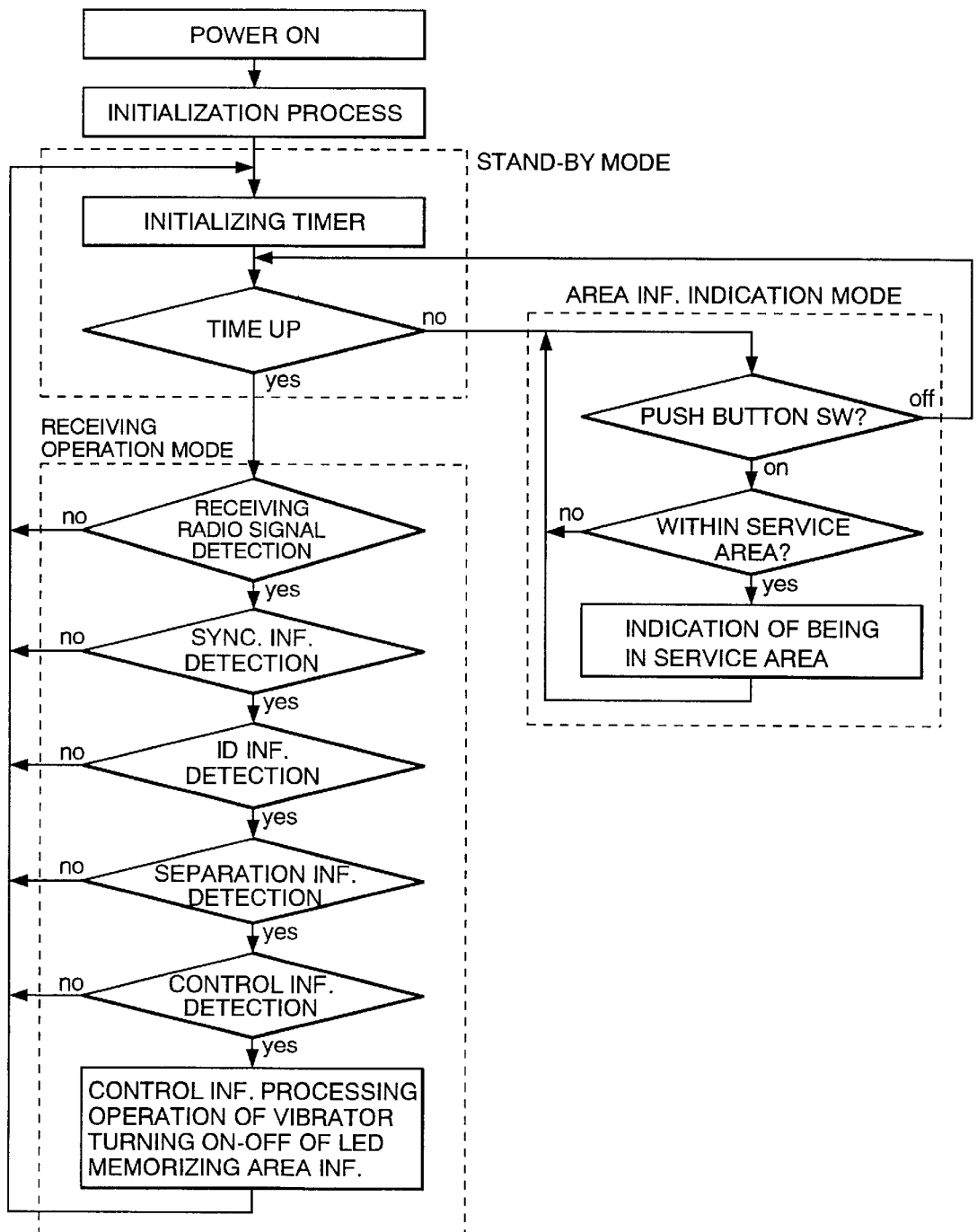
FIG. 6 shows an operation flow chart of the alarm device as another embodiment according to the present invention.

Further, another embodiment will be explained by referring to FIG. 6 showing an operation flow chart of the alarm device 2 of another embodiment, in accordance with the present invention. This another embodiment differs from the embodiment mentioned above in the detection portion of the preamble. Namely, the preamble detection mentioned above can be substituted with a detection of received radio frequency signal, as shown FIG. 6. In this received radio frequency signal detection, the receiving operation of 50 ms is performed by the function of measuring the field intensity of the received radio frequency signal of the alarm receiving circuit 22, and the alarm control circuit 23 decides it. When the received radio frequency signal can be detected, it moves back into a operation of detecting the synchronization information, otherwise when no radio frequency signal can be detected, it moves into the stand-by mode.

In this case, since the preamble is not necessary, the modulation of the preamble 31 is not necessary at the transmitter side. However, the transmission at the carrier frequency is necessary, since detection of the received radio frequency signal is necessary for establishing a timing between the transmitting end and the receiving end of the radio frequency signal.

Moreover, in accordance with another embodiment, by substituting another kind of two color LED display device which can display letters and image for the LED display device 26, and further by increasing the amount of information of the control information 35, display of a message service which has been put in practical use in recent years in the pager and/or the cellular mobile telephone can be achieved. And, it is also possible to display a message information including a call origination number, by sending it from the cellular mobile telephone apparatus 1 to the alarm device 2.

Moreover, in the embodiment mentioned above, the identification information 34 is previously assigned to the respective alarm devices 2. However, by using communication function between the cellular mobile telephone apparatus 1 and the alarm device 2, it is also possible to change the identification information 34 memorized in the alarm memorizing circuit 24 through the key input device 13 of the cellular mobile telephone apparatus 1. More concrete method of it is omitted since it is apparent from the explanation given heretofore. In doing so, the user can freely select and set the identification information 34. And, when using a plurality of the alarm devices 2 and assigning the same identification information to them, for instance, the user can make the plural alarm devices 2 operate at the same time, but does not need to manage the identification information of them respectively.

Figure 7:
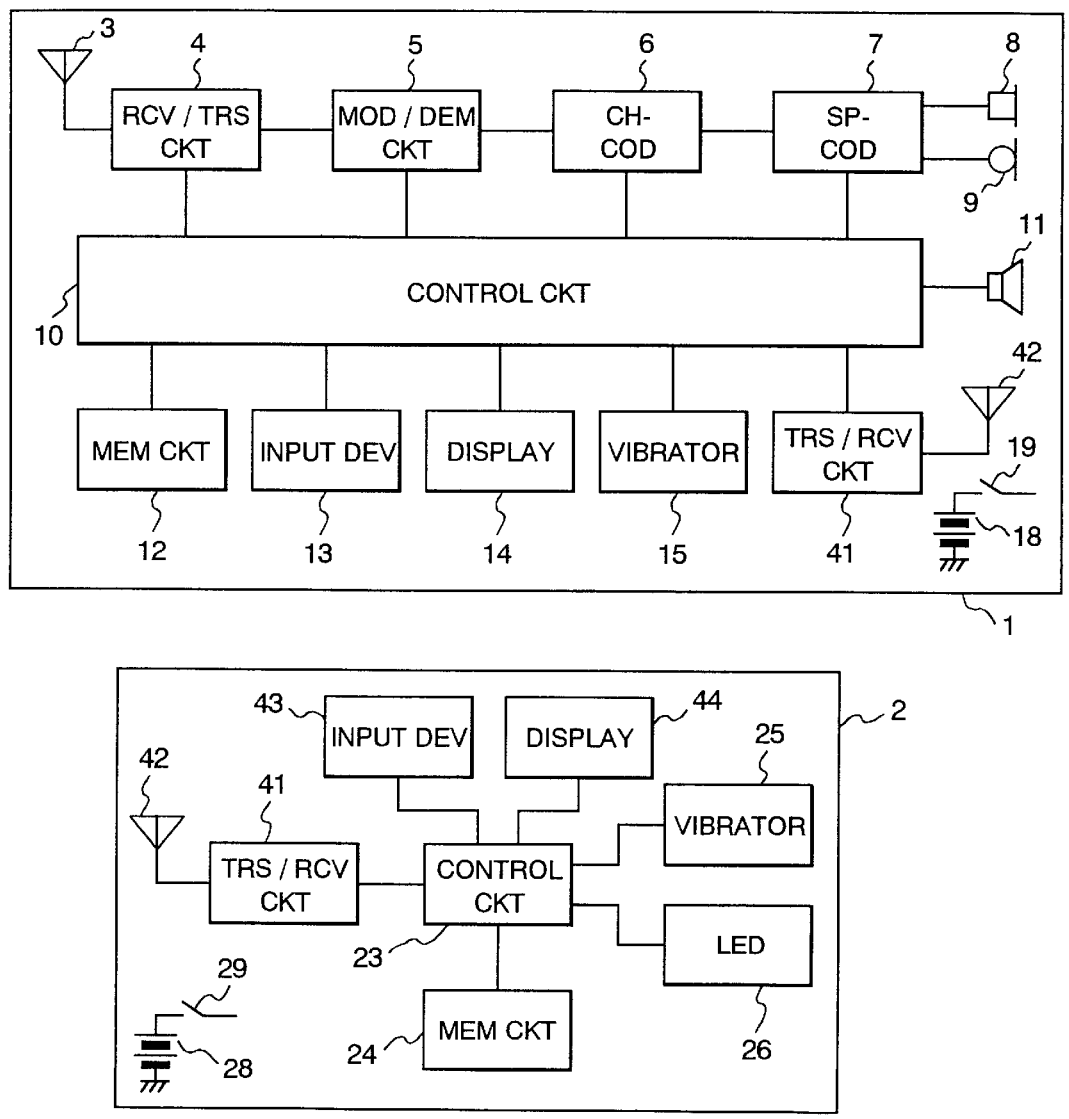
FIG. 7 shows constructions of the cellular mobile telephone apparatus and the alarm device as another embodiment according to the present invention.

Furthermore, another embodiment will be explained by referring to FIG. 7 showing construction of the cellular mobile telephone device and the alarm device of another embodiment, in accordance with the present invention. In the embodiment mentioned above, using the transmitter provided in the cellular mobile telephone device 1 and the receiver in the alarm device 2, the communication can be obtained only in one direction. However, as shown in FIG. 7, it is possible to construct such that each of the cellular mobile telephone device 1 and the alarm device 2 has the alarm transmitting circuit 41 and the alarm receiving antenna 42, respectively. With such construction, bi-directional communication can be obtained between the cellular mobile telephone device 1 and the alarm device 2. Further, with provision of a small-sized input device 43 onto the alarm device 2, it is possible for the user, by using the alarm device 2, to make remote control of the cellular mobile telephone apparatus 1 without taking out thereof.

For example, even though the cellular mobile telephone apparatus 1 receives the call termination thereto and notifies it to the user by operating the alarm device 2, the user necessarily cannot to respond the termination simultaneously, for instance when he/she is on the train or attending a meeting, or on another reason that the cellular mobile telephone apparatus 1 is inside of his/her bag. In such case, however, the user, by inputting an instruction to control the cellular mobile telephone apparatus 1 through the input device 43 of the alarm device 2, can send back a message that he/she cannot take the telephone apparatus right now, or can record the message from the sender by changing the cellular mobile telephone apparatus 1 into recording mode for his/her absence. Alternatively, he/she can see the message of the sender on the display device 44.

In the embodiment mentioned above, as the telephone apparatus is explained of the cellular mobile telephone system using the mobile base station, however, the present invention should not be limited only to such the type, but can cover other types which can achieve the object of the present invention mentioned above. Further, the external view, the construction, the circuitry and means of the apparatus and the devices mentioned in the above also should not be limited only to those shown in the various embodiments, for example, the construction and the contents of the information format relating transfer of the information (the preamble 31, the synchronization information 32, the separation information 33, the identification information 34 and the control information 35), the transfer speed, the frequency of the carrier radio frequency signal, the modulation method of the radio frequency signal, the operation timing of the alarm transmitting circuit 16 and the alarm receiving circuit 22, the operation elements and the operation contents of the alarm device 2, the operation and function of the push button switch 27, etc. In similar way, the operation flow chart of the alarm device 2 shown in the various embodiments also can cover other methods which are conceivable for the person skilled in the art for achieving the object of the present invention.

Furthermore, as the alarming means is explained the vibrator having the vibration generating means, but it should not be limited only to that vibration generating means. For example, means for generating impulse to a tactual sense by making a small projection going in and out, and other tactual sense impulsion means by way of changing the shape of the cellular mobile telephone apparatus 1 or the alarm device 2 itself can be adopted.

Moreover, as another alarming means, an electrical impulse generating means can be adopted, in which an electrode is kept touching with skin and gives an electric shock by weak current so as to make the user able to sense such current.

In similar manner, with the alarming means by the display means should not be limited to the method of turning the display device on and off, and a visual impulsion generating means for noticing the user through visual impulsion can be applied.

In those impulsion generating means mentioned above, it is of course that the impulsion is suppressed under such level that the used cannot be injured physically and mentally in order to keep the safety of the user in the practical use.

Furthermore, the radio frequency signal mentioned in the above should not be limited only to that radio frequency signal but also to cover other medium including an ultrasonic. As is apparent from the detailed description mentioned above, the cellular mobile telephone apparatus and the alarm device therefor, according to the present invention, always alarm the user thereof the information, including the call termination at the cellular mobile telephone apparatus, the exhaustion of the battery of the mobile telephone apparatus and information including that the telephone apparatus is located within the service area, clearly.

What is claimed is:

1. A cellular mobile telephone apparatus comprising a main body, an alarm device which is provided separately from said main body, said main body including:
   receiving/transmitting means for receiving and transmitting radio frequency signals between a base station;
   modulating/demodulating means for modulating and demodulating between the radio frequency signals, and a conversation signal and a control signal;
   telephone receiver means for reproducing audible conversation voice in response to the demodulated conversation signal from said modulating/demodulating means;
   telephone transmitting means for converting conversation voice into the conversation signal;
   means for controlling operation of said main body of said cellular mobile telephone apparatus in accordance with the control signal; and
   alarm signal means for providing an alarm signal which includes an identification information and is transmitted through the radio frequency, when a call is terminated at said main body, wherein said alarm signal means provides a control signal for controlling operation of said alarm device to indicate at least one of an incoming call and an operational status of the cellular mobile telephone apparatus;
   and said alarm device including:
      receiving means for receiving the alarm signal of radio frequency;
      means for discriminating the alarm signal assigned to itself from others by the identification information included therein; and
      alarm means for alarming call termination in response to the identification by said discriminating means.

2. A cellular mobile telephone apparatus defined in claim 1, wherein said main body further comprises means for storing the identification information and means for inputting the identification information.

3. A cellular mobile telephone apparatus defined in claim 2, wherein said inputting means includes push buttons of said main body in common use for dialing.

4. A cellular mobile telephone apparatus defined in claim 1, wherein the alarm signal provided by said alarm signal providing means is transmitted through said receiving/transmitting means of said main body.

5. A cellular mobile telephone apparatus defined in claim 1, wherein said alarm means of said alarm device includes a vibrator and issues an alarm through vibration thereof.

6. A cellular mobile telephone apparatus defined in claim 1, wherein said alarm signal providing means of said main body transmits the alarm signal intermittently.

7. A cellular mobile telephone apparatus defined in claim 6, wherein said receiving means of said alarm device intermittently receives the alarm signal transmitted intermittently from said alarm signal providing means.

8. A cellular mobile telephone apparatus defined in claim 7, wherein an interval Ttr of the intermittent transmission of the alarm signal from said main body is set to be greater than an interval Trcv of the intermittent reception by said alarm device.

9. A cellular mobile telephone apparatus defined in claim 1, wherein the identification information in the alarm signal from said alarm signal providing means includes a production serial number of said alarm device.

10. A cellular mobile telephone apparatus comprising a main body, an alarm device which is provided separately from said main body, said main body including:
    receiving/transmitting means for receiving and transmitting radio frequency signals between a base station;
    modulating/demodulating means for modulating and demodulating between the radio frequency signals, and a conversation signal and a control signal;
    telephone receiver means for reproducing audible conversation voice in response to the demodulated conversation signal from said modulating/demodulating means;
    telephone transmitting means for converting conversation voice into the conversation signal;
    means for controlling operation of said main body of said cellular mobile telephone apparatus in accordance with the control signal; and
    alarm signal means for providing an alarm signal which includes an identification information and is transmitted through the radio frequency, when a call is terminated at said main body, wherein said alarm signal means provides a control signal for controlling operation of said alarm device;
    and said alarm device including:
       receiving means for receiving the alarm signal of radio frequency;
       means for discriminating the alarm signal assigned to itself from others by the identification information included therein; and
       alarm means for alarming call termination in response to the identification by said discriminating means;
       wherein the control signal from said alarm signal providing means includes an alarm signal for alarming exhaustion of a battery of said main body.

11. A cellular mobile telephone apparatus defined in claim 10, wherein the control code of said alarm signal providing means includes a signal for indicating whether said cellular mobile telephone apparatus is located within an area where cellular mobile telephone service is available or not.

12. A cellular mobile telephone apparatus defined in claim 10, said alarm device further comprising means for alarming the exhaustion in the battery of said main body.

13. A cellular mobile telephone apparatus defined in claim 11, said alarm device further comprising means for indicating whether said cellular mobile telephone apparatus is located within an area where cellular mobile telephone service is available or not.

14. A cellular mobile telephone apparatus comprising a main body, an alarm device which is provided separately from said main body, said main body including:

receiving/transmitting means for receiving and transmitting radio frequency signals between a base station;

modulating/demodulating means for modulating and demodulating between the radio frequency signals, and a conversation signal and a control signal;

telephone receiver means for reproducing audible conversation voice in response to the demodulated conversation signal from said modulating/demodulating means;

telephone transmitting means for converting conversation voice into the conversation signal;

means for controlling operation of said main body of said cellular mobile telephone apparatus in accordance with the control signal; and alarm signal means for providing an alarm signal which includes an identification information and is transmitted through the radio frequency, when a call is terminated at said main body, wherein said alarm signal means provides a control signal for selecting a plurality of differing alarm signaling modes for effecting a plurality of differing types of alarms of said alarm device;

and said alarm device including:

receiving means for receiving the alarm signal of radio frequency;

means for discriminating the alarm signal assigned to itself from others by the identification information included therein; and alarm means for alarming call termination in response to the identification by said discriminating means.

* * * * *